US008010786B1

(12) United States Patent
Ward

(10) Patent No.: US 8,010,786 B1
(45) Date of Patent: Aug. 30, 2011

(54) SYSTEMS AND METHODS FOR MANAGING DIGITAL CERTIFICATE BASED COMMUNICATIONS

(75) Inventor: Hilary Ward, Princeton Junction, NJ (US)

(73) Assignee: Citigroup Global Markets Inc., New York, NY (US)

( * ) Notice: Subject to any disclaimer, the term of this patent is extended or adjusted under 35 U.S.C. 154(b) by 964 days.

(21) Appl. No.: 11/981,177

(22) Filed: Oct. 30, 2007

Related U.S. Application Data

(60) Provisional application No. 60/855,719, filed on Oct. 30, 2006.

(51) Int. Cl.
H04L 29/06 (2006.01)

(52) U.S. Cl. .................................... 713/156

(58) Field of Classification Search ................ None
See application file for complete search history.

(56) References Cited

U.S. PATENT DOCUMENTS

| | | | |
|---|---|---|---|
| 6,978,364 B1 * | 12/2005 | Balaz et al. ................. 713/153 |
| 7,083,090 B2 | 8/2006 | Zuili | |
| 7,392,533 B2 | 6/2008 | Ternasky et al. | |
| 7,448,080 B2 * | 11/2008 | Karjala et al. ............... 726/15 |
| 7,500,097 B2 * | 3/2009 | Kostal et al. ................ 713/156 |
| 7,509,489 B2 * | 3/2009 | Kostal et al. ................ 713/156 |
| 7,580,857 B2 | 8/2009 | VanFleet et al. | |
| 7,610,484 B2 * | 10/2009 | Kapoor ......................... 713/156 |
| 7,761,374 B2 | 7/2010 | Sahota et al. | |
| 2003/0191703 A1 | 10/2003 | Chen et al. | |
| 2003/0217264 A1 | 11/2003 | Martin et al. | |
| 2004/0044621 A1 | 3/2004 | Huang et al. | |
| 2004/0107170 A1 | 6/2004 | Labrou et al. | |
| 2004/0128392 A1 | 7/2004 | Blakley et al. | |
| 2005/0120125 A1 | 6/2005 | Morten et al. | |
| 2006/0143107 A1 | 6/2006 | Dumas et al. | |
| 2006/0195816 A1 | 8/2006 | Grandcolas et al. | |
| 2006/0282528 A1 | 12/2006 | Madams et al. | |
| 2007/0022469 A1 | 1/2007 | Cooper et al. | |
| 2007/0112578 A1 | 5/2007 | Randle et al. | |
| 2007/0179885 A1 | 8/2007 | Bird et al. | |
| 2007/0215683 A1 | 9/2007 | Koorland et al. | |

OTHER PUBLICATIONS

Non-Final OA issued Dec. 17, 2010 in U.S. Appl. No. 12/041,425.
U.S. Appl. No. 12/049,086, filed Mar. 14, 2008.
Bank of America PayMode. (2004) Retrieved from http://corp.bankofamerica.com/public/portal?_pd_page_label=paymode/services/security on Dec. 29, 2008.
U.S. Appl. No. 12/041,425, filed Mar. 3, 2008.
Non-Final OA issued Apr. 19, 2011 in U.S. Appl. No. 12/049,086.

\* cited by examiner

Primary Examiner — Minh Dinh
(74) Attorney, Agent, or Firm — Ropes & Gray LLP

(57) ABSTRACT

A system for providing interoperability between PKI networks is provided in which a identity management server converts PKI requests received in a client-specific format into a generic format, identifies an appropriate certificate authority for handling the request, converts the request into a format specific to the format used by the identified certificate authority, and forwards the request to the identified certificate authority for processing.

25 Claims, 2 Drawing Sheets

SYSTEMS AND METHODS FOR MANAGING DIGITAL CERTIFICATE BASED COMMUNICATIONS

CROSS-REFERENCE TO RELATED APPLICATIONS

This application incorporates by reference in entirety, and claims priority to and benefit of, U.S. Provisional Patent Application No. 60/855,719, entitled "Systems and Methods for Managing Digital Certificate Based Communications," and filed on Oct. 30, 2006.

FIELD OF THE INVENTION

This invention relates to systems and methods for managing communications in identity management systems.

BACKGROUND OF THE INVENTION

Businesses and governments utilize identity management systems to manage user identities across multiple systems and applications in order to ensure that unauthorized parties do not access sensitive user communications.

Certain identity management solutions rely on a system known as Private Key Infrastructures (PKI), which enables users to be authenticated to each other by confirming identities through a trusted third party entity. Each PKI user is issued both a private key, such as a code or other identifier that is known only to the user, and a public key, which is disclosed to all users. Central to a PKI system is that fact that the public key be issued by the trusted third party. For example, if user A wishes to send a sensitive message to user B, user A would use user B's public key available from the trusted third party to encrypt the message, which user B would decrypt with his private key. If public keys were not controlled by a trusted third party, however, a malicious party could publish a public key purporting to be user B, and thereby intercept messages to user B using the phony public key's private equivalent. To avoid this problem, institutions known as Certificate Authorities (CA) often serve the role of independent, trusted third parties to issue and manage identify certificates. In addition to encrypting messages (which ensures privacy), user A can authenticate himself to user B by using user A's private key to encrypt a digital certificate. When user B receives it, she can use her public key to decrypt it, verifying first with the CA that the digital certificate is valid. However, there is currently no single CA for PKI systems. Companies seeking to communicate securely with a range of different users often must utilize many different CAs, which each use their own infrastructures and rule sets. Examples of CAs include Identrus, Entrust and VeriSign.

In attempts to simplify communications between clients and various public key infrastructures and certificate authorities, others have proposed that all clients in need of PKI service implement a generic protocol for PKI-related communications. Such communications would then be translated by a central service into the protocol and format used by a destination PKI. However, certain PKI protocols have advantages and disadvantages over other PKI protocols. Thus, various entities may have legitimate desires for using specific PKI protocols based on their particular application set and user base. Similarly, adopting a generic protocol provides disincentives for making advances in PKI protocols, as changes to protocols would need wide acceptance before they are incorporated into the generic protocol. Thus, a need remains in the art for a PKI architecture that both promotes interoperability between PKI protocols while retaining the ability for PKI users to adopt, develop, and/or modify a PKI protocol that makes the most sense for the user.

SUMMARY OF THE INVENTION

Thus, according to one aspect, the invention relates to a system that allows multiple PKI users to communicate using different PKI networks using a simple, centralized system.

In certain embodiments, this invention provides for a software system that serves as an intermediary between a company and multiple CAs so that companies have a single conduit for digital certificate issuance and lifecycle management. In certain embodiments, the system may be configured to allow a user to submit messages through a central interface associated with a hub application, and have those messages routed directly to a CA without any further manual intervention by the user. The CA may be selected by the user or by the hub application. For example, the user or the hub may select among various CAs available to the hub application based on the geographic location of the user or the intended recipient of a message, or based on the costs of using each of the various CAs for the particular message communication being sent. Certain embodiments also ensure that each message that is sent between customer applications and the selected CA is encrypted or otherwise protected with a security module.

According to another aspect, the invention relates to a identity management server 108 for providing PKI interoperability services. The identity management server 108 includes a server which is configured to receive a PKI request from a client in a format which is specific to the client and to convert the PKI request into a generic format. The PKI request may be an authentication request or a lifecycle management request, such as a certificate issuance, suspension, unsuspension, rekeying, modification, or revocation request.

The processor is also configured to identify a certificate authority from a plurality of certificate authorities to handle the PKI request. The certificate authority may be identified based on a specific identification of a certificate authority in the PKI request, for example, when the request includes a request to authenticate a message based on a certificate issued by a particular certificate authority. Alternatively, the certificate authority is identified based on characteristics of the request and characteristics of the respective certificate authorities, including, for example, a level of trust required by the request, the cost charged by the respective certificate authorities, and the location of the certificate authority.

Based on the identification of the certificate authority, the processor is configured to covert the request from the generic format into the PKI format and protocol used by the identified certificate authority. The processor then forwards the PKI request in the certificate authority-specific format to the certificate authority for processing. In one embodiment, the processor authenticates the source of the PKI request prior to forwarding it to the identified certificate authority. The authentication can be based on a certificate included with the PKI request, by communicating with the certificate authority issuing such certificate.

In one embodiment, all communications between clients and the identity management server 108 and the identity management server 108 and the respective certificate authorities are made over secure channels, for example secure socket layer HTTPS connections. According to another feature, the communications are made using a Web Service architecture, using, for example, SOAP.

According to another feature, the processor is configured to generate keys for clients based on PKI requests. The processor is configured, in one embodiment, to manage multiple certificates for each client.

According to another aspect, the invention relates to a method of handling PKI requests. The method includes receiving a PKI request from a client in a client-specific format and converting the PKI request into a generic format. The method further includes identifying a certificate authority to handle the PKI request, converting the PKI request from the generic format into format used by the certificate authority, and forwarding the PKI request to the certificate authority in the certificate authority-specific format.

According to further aspect, the invention relates to software in the form of a computer readable medium encoding computer executable instructions, which when executed by a processor, cause the processor to carry out the methodology described above.

BRIEF DESCRIPTION OF THE DRAWINGS

The foregoing discussion will be understood more readily from the following detailed description of the invention with reference to the following drawings.

DESCRIPTION OF CERTAIN ILLUSTRATIVE EMBODIMENT

To provide an overall understanding of the invention, certain illustrative embodiments will now be described, including apparatus and methods for handling PKI requests. However, it will be understood by one of ordinary skill in the art that the apparatus and methods described herein may be adapted and modified as is appropriate for the application being addressed and that the systems and methods described herein may be employed in other suitable applications, and that such other additions and modifications will not depart from the scope hereof.

Figure 1:
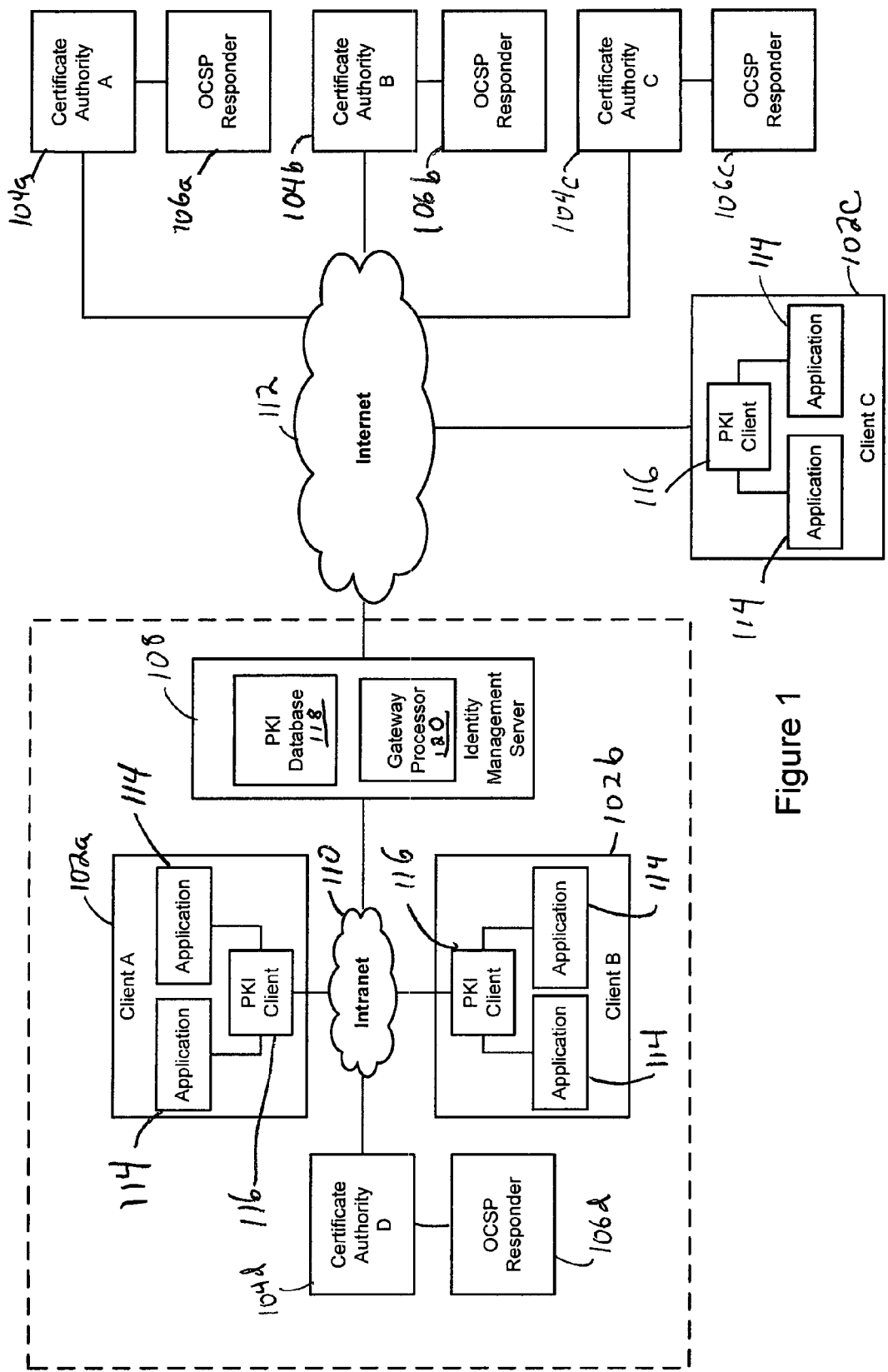
FIG. 1 is a block diagram of an architecture for providing PKI interoperability, according to an illustrative embodiment of the invention.

FIG. 1 is a block diagram of an architecture 100 for providing PKI interoperability, according to an illustrative embodiment of the invention. The architecture 100 includes several client computers 102a-102c (generally "client computers 102"). The architecture 100 also includes certificate authorities 104a-104d (generally "certificate authorities 104") with corresponding OCSP responders 106a-106d (generally (responders 106") and a identity management server 108. The number of client computers 102 and certificate authorities 104 depicted is merely for illustrative purposes. The architecture, in various embodiments may support many more client computers 102 and certificate authorities 104.

Components of the architecture 100 are connected via wired and/or wired connections over a local area network 110 and/or a wide area network 112. Suitable wide area networks include the Internet as well as private networks, such as the private communications networks connecting financial institutions across the globe. For example, in the illustrative architecture 100, client computers 102a and 102b, certificate authority 104d, and identity management server 108 are part of a single entity, such as a bank, and are connected by a LAN 110. Client 102c and certificate authorities 104a-104c are part of distinct entities and communicates with the identity management server 108 over the Internet 112. In alternative embodiments, the identity management server 108 is part of an entity that is distinct from all client computers 102 and certificate authorities 104. Identity management server 108, in one implementation, operates on a gateway server for an entity that provides access to a wide area network 112. Alternatively, the identity management server 108 may operate on a server wholly within the entity's LAN or on an outside server, run by an entity independent from the client computers 102.

Client computers 102 may include desktop computers, laptop computers, mainframes, personal digital assistants, mobile telephones, or other computing devices known in the art including microprocessors capable of loading and executing applications 114 and remote communication with other computing devices over a network. Each client computer 102 executes applications 114 having varying needs for secure communications as well as a PKI client 116, such as PKI client 116a executed by client computers 102a and 102b and PKI client 116b executed by client computer 102c. The PKI clients 116a and 116b are specific to the entity to which the client computer 102 belongs, operate according to their own protocols, and communicate messages using their own formats. The PKI clients 116a and 116b may be clients of standard PKI software infrastructures known in the art, including, for example, ENTRUST AUTHORITY, available from Entrust, Inc. of Addison, Tex., KEON, available from RSA Security of Bedford, Mass., and IDENTRUST TRUST NETWORK, IDENTRUST TRUST BLUEPRINT, and IDENTRUST TRUST SIGN available from IdenTrust, of San Francisco, Calif. Alternatively, the PKI client 116 may be a custom built PKI client 116.

Among other capabilities, the PKI clients 116 are configured to digitally sign communications initiated by the applications 114, initiate authentication procedures to authenticate digitally signed communications received by the client computer 102 from third parties, and initiate PKI lifecycle requests, such as for the issuance, suspension, unsuspension, rekeying, modification, or revocation of an existing PKI certificate. The PKI client 116 may also include encryption and decryption capabilities. Alternatively, these capabilities may be implemented by one or more applications 114 operating on the client computer 102.

The certificate authorities 104 issue, generate, and authenticate public key certificates used by the PKI client 116 for trusted communications with third parties. Each certificate authority 104 operates according to its own respective protocol, which may or may not be directly compatible with the protocols used by other certificate authorities 104. The certificate authorities 104 are in communication with respective OCSP (Online Certificate Status Protocol) responders 106. As known in the art, OCSP responders 106 maintain data identifying PKI certificates issued by a certificate authority 104 that have been revoked. In the illustrative architecture 100, each certificate authority 104 has its own respective OCSP responder 106. In alternative implementations, one or more certificate authorities 104 may share a common responder 106.

Each certificate authority 104 may have unique characteristics, including for example, geographic location, fee structure, level of trustworthiness, contractual terms dictating client/certificate authority 104 relationship and associated obligations and liabilities. Based on these characteristics, different certificate authorities 104 may be more appropriate for different communications, different applications, and different recipients of signed communications. For example, execution of a signed legal document might require the use of certificate authority 104 located within the jurisdiction in which the document is being executed. Communications requiring high levels of assurance may justify higher costs charged by certificate authorities 104 accepting larger levels of liability in case of failure. Less sensitive communications might only require minimal security and liability protection, therefore enabling use of a low-cost certificate authority 104.

The identity management server 108 includes a PKI database 118 and a processor 120. The PKI database 118 stores public key information for the client computers 102. In one implementation, the PKI database stores multiple PKI keys and certificates for each client computer 102. Alternatively, the database 118 may store such information for each user of the system, regardless of the client computer 102 from which the user communicates with the identity management server 108.

The processor 120 may also have access to volatile and non-volatile data storage devices, such as magnetic disks, optical disks, magneto-optical disks, and integrated circuit memory. One of the data storage devices stores computer executable instructions, which when executed by the processor 120 causes the processor to carry out the functionality described below in relation to FIG. 2. In addition to the functionality described below in relation to FIG. 2, the identity management server 108 includes functionality for generating and archiving key pairs for communications with users of the client computers 102. In alternative implementations, the identity management server 108 operates in a distributed fashion over multiple processors. In still other implementations, the identity management server 108 may include one or more application specific integrated circuits or other special purpose circuitry for executing the more mathematically intense processes described below, such as encryption and decryption.

Figure 2:
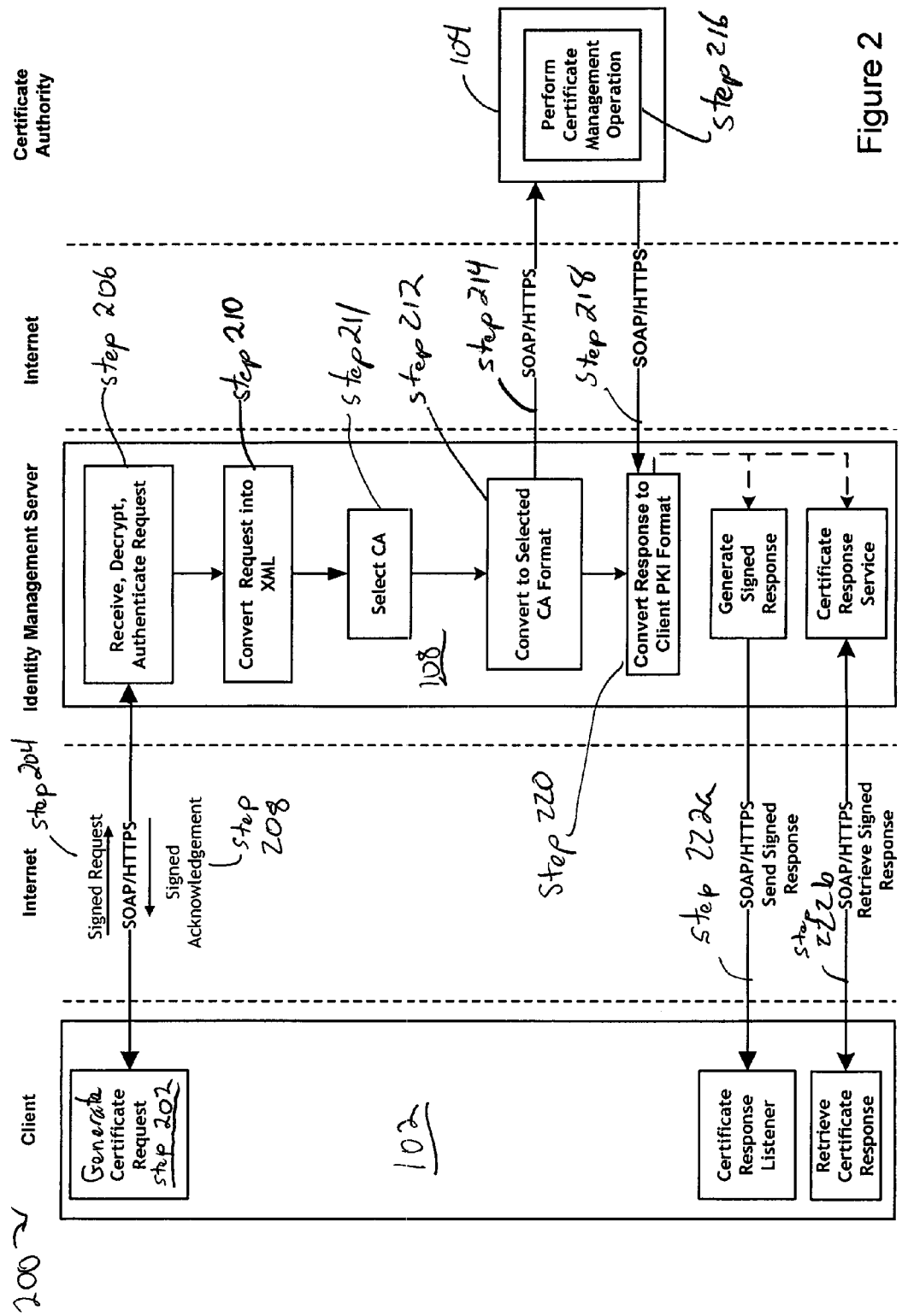
FIG. 2 is a flow diagram of a method for processing PKI requests using the architecture of FIG. 1, according to an illustrative embodiment of the invention.

FIG. 2 is flow diagram of a method 200 for handling PKI requests according to an illustrative embodiment of the invention. The method includes communications between a client computer 102, the identity management server 108, and a certificate authority 104 using the SOAP protocol over HTTPS links.

The method 200 begins with the client computer 102 generating a PKI request (step 202). The PKI request may be an authentication or signing request, or a it may be a certificate life cycle request. In the case of an authentication or signing request, the PKI request is typically generated automatically by an application 114 used by the user on the client computer 102 in response to the application 114 receiving a signed communication or transmitting a communication requiring signing with a digital certificate. Lifecycle requests, on the other hand, are typically initiated by a user manually, using a web interface to the identity management server 108. In some circumstances, lifecycle requests may be initiated automatically by an application 114 on the client computer 102. For example, an application may initiate a suspension or revocation request in response to detecting a potential security threat, such as a user entering an incorrect password more than a threshold number of times or in response to a security application detecting an intrusion.

Upon generation of a PKI request, the PKI client 116 of the client computer 102 digitally signs the request using a private key generated by the identity management server 108 and transmits the PKI request to the identity management server 108 (step 204). As indicated above, communications between the client computer 102 and the identity management server 108 are preferably over an HTTPS link, and thus are encrypted. Upon receipt, the identity management server 108 decrypts and authenticates the PKI request using the public key of the user saved in the PKI database 118 of the identity management server 108 (step 206). The identity management server also verifies whether the PKI request is in a format it recognizes and whether the request is complete (for example, whether it includes acceptable data for all parameters needed to process the request). The identity management server 108 then transmits an acknowledgement message back to the user, signed using the private key of the identity management server 108 (step 208). If the identity management server 108 find that it cannot recognize the format of the request or that the request is incomplete, the identity management server 108 includes such information in the acknowledgement message or in a separate error message.

After authenticating the PKI request, the gateway processor 108 converts the PKI request into a generic format, preferably in an XML schema (step 210). The identity management server 108 stores software conversion modules for converting commonly used PKI protocols. In addition, if users using custom or rarely used PKI protocols wish to use the identity management server 108, prior to use, such users communicate an API corresponding to the protocol, to enable the identity management server 108 to convert the PKI request into the generic format.

Subsequently, the identity management server 108 identifies a certificate authority 104 for handling the PKI request (step 211). If the PKI request is an authentication request, the identity management server 108 identifies the certificate authority 104 that issued the certificate used to sign the message sought to be authenticated. If the PKI request is a signing request, a certificate retrieval request, or a certificate issuance request, unless the request specifies a certificate authority 104 to use for the request, the identity management server 108 applies business rules stored in the PKI database or other data storage device to identify a certificate authority 104 providing the appropriate combination of cost, trustworthiness, location, and other characteristics for the message being communicated. If the PKI request is a lifecycle management request other than an issuance request, the identity management server 108 identifies the certificate authority 104 responsible for the certificate for which lifecycle management is requested.

If the PKI request is a signing request, and the identity management server 108 already has a digital certificate for the user from the identified certificate authority 104 stored in its PKI database 118, the identity management server 108 verifies the status of the stored digital certificate with the certificate authority 104 using a protocol specific to that certificate authority 104. If the certificate is still valid, the identity management server 108 signs the message using the certificate and forwards it to its destination, or returns it to the client computer 102 for forwarding to its destination. If the request is a certificate retrieval request, instead of signing a message, if a valid certificate is available in the PKI database 118, the identity management server 108 forwards the valid certificate to the client compute r102. In one embodiment, if the certificate is invalid, or if the user does not have a certificate stored at the identity management server 108 for the identified certificate authority 104, the identity management server 108 initiates a certificate issuance request to the identified certificate authority 104. In alternative embodiments 104, the identity management server 108 identifies an alternative certificate authority 104 for which the user has a valid certificate stored in the PKI database.

For authentication requests and lifecycle management requests, the identity management server 108 converts the PKI request, now in the generic format, into the format used by the identified certificate authority 104 (step 212). In one embodiment, the identity management server 108 stores a lookup table correlating PKI protocols with respective certificate authorities 104. The identity management server 108 then forwards the PKI request in the certificate authority 104-specific format to the identified certificate authority 104 over a secure HTTPS communication link, preferably using the SOAP protocol (step 214). The identity management server 108 may optionally digitally sign the PKI request prior to forwarding it to the certificate authority 104.

The certificate authority 104 processes the PKI request (step 216) and sends a response back to the identity management server 108 (step 218). The identity management server 108 converts the response back into the client computer-specific PKI protocol, by converting the response into the generic format and converting the response in the generic format into the client computer-specific PKI protocol (step 220). If the PKI request was a certificate issuance request, the identity management server 108 stores the digital certificate returned by the certificate authority 104 in its PKI database 118.

The identity management server 108 then provides the response back to the client computer 102 in the client computer-specific format, signed by the identity management server 108 (step 222a or 222b). The identity management server 108 can take an active role in providing the response (step 222a) or a passive role (step 222b). In the active response implementation (step 222a), the client computer 102 utilizes a web service listener accessible by the identity management server 108, such that the identity management server 108 can forward a response immediately. In an alternative implementation (for step 222b), the identity management server 108 utilizes a web service listener and awaits requests for response from the client computer 102. As a response to the PKI request may not yet be available the first time the client computer 102 seeks a response, the client computer 102 may have to seek a response multiple times before receiving one. In one implementation of the passive response process (step 222b), the identity management server 108 responds to each request from the client web service with either the results of the PKI request (e.g., a requested certificate), if available, or, if results are not yet available, the identity management server 108 responds with a message indicating the status of the PKI request.

In some implementations, particularly for implementations using the active response process (step 222a), the architecture 100 provides a separate inquiry process for client computers 102 to verify the status of prior PKI requests with the identity management server 108. Such status requests can be processed according to the same process above. In both cases, the status of a request may be: request received, request being processed, request successful, request previously satisfied, request failed, the user's service level agreement with a respective certificate authority has expired, or an indication that the request included a data error.

In addition to the functionality described above, the identity management server 108 includes administrative functionality accessible through a secure web site. The administrative functionality enables enrollment of new client computers 102 and trusted users, as well as the modification of the rights of such users. The administrative functionality also enables a user to obtain reports about their usage of the identity management server 108 and various certificate authorities 104.

While other forms of security may be used to provide high assurance services using the architecture 100, without departing from the scope of the invention, in one implementation, the following security measures are implemented throughout the architecture 100. The identity management server 108 and the client computers 102 communicate using secure socket layer connections for transport level security. Web service communications are secured according to the Web Service Security 1.0 specification, incorporated herein in its entirety by reference, and are signed by IdenTrust certificates. SOAP message content is secured according to the same specification, using an enveloping signature of the body of the SOAP messages, in addition to signing using an X509 certificate in BinarySecurityToken The invention may be embodied in other specific forms without departing from the spirit or essential characteristics thereof. The forgoing embodiments are therefore to be considered in all respects illustrative, rather than limiting of the invention.

What is claimed is:

1. An identity management server comprising:
a processor configured to:
receive a PKI request from a client in a client-specific format;
convert the PKI request into a generic format;
identify a certificate authority from a plurality of certificate authorities to handle the PKI request, wherein the identified certificate authority operates according to an authority-specific format;
convert the PKI request from the generic format into the authority-specific format; and
forward the PKI request in the authority specific format to the identified certificate authority.

2. The identity management server of claim 1, wherein the processor is configured to decrypt the PKI request received from the client prior to converting the PKI request into the generic format.

3. The identity management server of claim 1, wherein the processor is configured to authenticate the PKI request received from the client prior to forwarding the PKI request to the identified certificate authority.

4. The identity management server of claim 3, wherein the PKI request is authenticated based on a PKI certificate received with the PKI request.

5. The identity management server of claim 4, wherein authenticating the PKI request comprises confirming the status of the certificate received with the PKI request via communication with a certificate authority responsible for the PKI certificate.

6. The identity management server of claim 1, wherein the PKI request is forwarded to the identified certificate authority over a secure channel.

7. The identity management server of claim 6, wherein the secure channel comprises a SSL or an HTTPS communication channel.

8. The identity management server of claim 1, wherein the identity management server communicates with the client over a secure channel.

9. The identity management server of claim 1, wherein the identity management server communicates with the client and the plurality of certificate authorities via a web service protocol.

10. The identity management server of claim 1, wherein the PKI request comprises a PKI request.

11. The identity management server of claim 1, wherein the processor is configured to generate a key based on the PKI request.

12. The identity management server 108 of claim 1, wherein the processor is configured to manage a plurality of certificates for the client.

13. A method comprising:
receiving a PKI request from a client in a client-specific format;
converting the lifecylce request into a generic format;
identifying a certificate authority from a plurality of certificate authorities to handle the PKI request, wherein the identified certificate authority operates according to an authority-specific format;
converting the PKI request from the generic format into the authority-specific format; and
forwarding the PKI request in the authority-specific format to the identified certificate authority.

14. The method of claim 13, comprising decrypting the PKI request received from the client prior to converting the PKI request into the generic format.

15. The method of claim 13, comprising authenticating the PKI request received from the client prior to forwarding the PKI request to the identified certificate authority.

16. The method of claim 15, comprising authenticating the PKI request based on a PKI certificate received with the PKI request.

17. The method of claim 13, comprising providing a response back to the client based on a response received from the identified certificate authority.

18. The method of claim 13, wherein the PKI request is forwarded to the identified certificate authority over a secure channel.

19. The method of claim 18, wherein the secure channel comprises an HTTPS communication channel.

20. The method of claim 13, wherein the PKI request is received from the client over a secure channel.

21. The method of claim 13, wherein the PKI request is received and forwarded to the identified certificate authority over respective web service channels.

22. The method of claim 13, wherein the PKI request comprises a PKI request.

23. The method of claim 13, comprising generating a key based on the PKI request.

24. The method of claim 13, comprising managing a plurality of PKI certificates for the client.

25. A non-transitory computer readable medium storing computer executable instructions, which, when executed by a processor, cause the process to carry out a method comprising:
receiving a PKI request from a client in a client-specific format;
converting the PKI request into a generic format;
identifying a certificate authority from a plurality of certificate authorities to handle the PKI request, wherein the identified certificate authority utilizes an authority-specific format;
converting the PKI request from the generic format into the authority-specific format; and
forwarding the PKI request in the authority specific format to the identified certificate authority.

* * * * *

UNITED STATES PATENT AND TRADEMARK OFFICE
CERTIFICATE OF CORRECTION

| | | |
|---|---|---|
| PATENT NO. | : 8,010,786 B1 | Page 1 of 1 |
| APPLICATION NO. | : 11/981177 | |
| DATED | : August 30, 2011 | |
| INVENTOR(S) | : Hilary Ward | |

It is certified that error appears in the above-identified patent and that said Letters Patent is hereby corrected as shown below:

In the Claims:

In claim 13, column 9, line 4, replace "lifecylce" with --PKI--.

Signed and Sealed this
Twenty-fifth Day of October, 2011

David J. Kappos
*Director of the United States Patent and Trademark Office*